(12) United States Patent
Seale (10) Patent No.: US 11,645,940 B2
(45) Date of Patent: May 9, 2023

(54) EDUCATIONAL KEYBOARD DEVICE

(71) Applicant: KeyMaster Electronics LLC, Orem, UT (US)

(72) Inventor: Kelly Seale, Orem, UT (US)

(73) Assignee: KEYMASTER ELECTRONICS LLC, Orem, UT (US)

(*) Notice: Subject to any disclaimer, the term of this patent is extended or adjusted under 35 U.S.C. 154(b) by 0 days.

(21) Appl. No.: 17/710,465

(22) Filed: Mar. 31, 2022

(65) Prior Publication Data

US 2022/0223063 A1    Jul. 14, 2022

Related U.S. Application Data

(63) Continuation of application No. 16/904,760, filed on Jun. 18, 2020.

(60) Provisional application No. 62/864,336, filed on Jun. 20, 2019.

(51) Int. Cl.

| | | |
|---|---|---|
| G06F 3/047 | (2006.01) |
| G09B 13/00 | (2006.01) |
| G06F 3/02  | (2006.01) |
| F21V 23/04 | (2006.01) |
| F21V 11/08 | (2006.01) |
| G06F 3/041 | (2006.01) |

(52) U.S. Cl.
CPC .............. *G09B 13/00* (2013.01); *F21V 11/08* (2013.01); *F21V 23/04* (2013.01); *G06F 3/0202* (2013.01); *G06F 3/041* (2013.01)

(58) Field of Classification Search
None
See application file for complete search history.

(56) References Cited

U.S. PATENT DOCUMENTS

2010/0271839 A1* 10/2010 Chan ...................... H01H 13/83
362/602

* cited by examiner

*Primary Examiner* — Carl Adams (57) ABSTRACT

This disclosure describes a keyboard that is selectively configurable in a testing mode, where characters are not visible on a set of touch-based input receivers of the input device, a training mode, where characters are visible on some but not all of the set of touch-based input receivers of the input device, and a standard mode, where characters are visible on all of the set of touch-based input receivers of the input device. This disclosure also describes techniques for manufacturing the input device and illuminating characters via the touch-based input receivers. The described keyboard improves on conventional input devices by allowing selection of one or more touch-based input receivers for which characters are illuminated, or selection of a testing mode where a user cannot see characters on any of the touch-based input receivers.

18 Claims, 9 Drawing Sheets

EDUCATIONAL KEYBOARD DEVICE

BACKGROUND

Computer skills have become essential for many careers in developed and developing countries. Because of this, many education systems, including elementary schools, focus on providing training to children and those who are new to computer-based industries. This training includes teaching proficiency with input devices, such as keyboards.

Many education systems test students for accuracy and speed (e.g., words per minute) to measure proficiency with a keyboard. When testing, students often choose to look at the keyboard to identify a correct key by a label, but they sacrifice speed to do so. Additionally, looking at the keyboard may be against the rules for the test, but teachers cannot possibly monitor every student at all times to ensure that none of them peek at the keyboard.

Current methods of preventing users from looking at their fingers while typing all fall short in one way or another. Blacked out keyboards can only be used during keyboarding instruction but are not ideal for day-to-day use. Schools who use blacked out keyboards have to unplug them and replace them with traditional keyboards for normal activities. Other solutions include placing a keyboard skin over the keyboard, but they often don't fit or feel right, which changes the typing experience and may not translate to typing on a normal keyboard.

Therefore, it may be advantageous to provide a keyboard that removes a temptation to sacrifice typing speed by peeking at labels on keys of the keyboard. However, it may be impractical to always use a keyboard without labels, to swap out keyboards for testing, or to place a keyboard skin over the keyboard.

This Background introduces a selection of concepts in a simplified form that are further described below. This Background is not an admission of prior art and should not be considered as such.

SUMMARY

This disclosure describes an input device that is selectively configurable in a testing mode, where characters are not visible on a set of touch-based input receivers of the input device, a training mode, where characters are visible on some but not all of the set of touch-based input receivers (e.g., keys) of the input device (e.g., keyboard), and a standard mode, where characters are visible on all of the set of touch-based input receivers of the input device. This disclosure also describes techniques for manufacturing the input device and illuminating characters via the touch-based input receivers. The described input device improves on conventional input devices by allowing selection of one or more touch-based input receivers for which characters are illuminated, or selection of a testing mode where a user cannot see characters on any of the touch-based input receivers.

In some example implementations, an input device includes a plurality of touch-based input receivers, each having a translucent portion and a surrounding opaque portion (surrounding the translucent portion). The translucent portion of each touch-based input receiver is in a shape of a character. The touch-based input receivers are devoid of a color-based representation of the character that is permanently or semi-permanently applied to the touch-based input receivers. The input device also includes a lighting system underneath one or more of the plurality of touch-based input receivers. The lighting system is selectively configurable in an activate state and an inactive state. When configured in the active state, one or more lights of the lighting system are activated such that visible light escapes a set of the touch-based input receivers via the translucent portion. When configured in the inactive state, one or more lights of the lighting system are inactive such that one or more of the set of the plurality of touch-based input receivers appear devoid of a symbol of an associated character.

In some implementations of a method for manufacturing touch-based input receivers for an input device, the method includes coating an upper surface of each of the plurality of touch-based input receivers with an opaque film. The touch-based input receivers each include a translucent substrate. The method also includes removing a portion of the opaque film from a portion of the upper surface (outer surface) of each touch-based input receiver such that a portion of the translucent substrate is exposed. The respective exposed portions of the translucent substrate of each respective touch-based input receiver may be shaped as a respective character. The method further includes coating the upper surface of each of the plurality of touch-based input receivers with a translucent film. As a result of coating with the translucent film, the upper surface of the touch-based input receivers has a smooth transition from the exposed portions of the translucent substrate to adjacent portions of the translucent substrate having an opaque film on the upper surface.

In some implementations of a method, performed by an input device, for illuminating a character via one or more touch-based input receivers, the method includes receiving input to configure a lighting system, of the input device, into an active state. The method also includes activating one or more lights of the lighting system such that visible light escapes a set of touch-based input receivers via translucent portions of respective ones of the set of touch-based input receivers. The method further includes receiving input to select touch-based input receivers to include in the set of touch-based input receivers.

Some embodiments include a keyboard that includes a plurality of keys and a plurality of light sources disposed beneath the plurality of keys. In some embodiments, each key of the plurality of keys has a translucent portion in a shape of a unique character and a surrounding opaque portion. In some embodiments, each light source of the plurality of light sources is disposed beneath a corresponding key of the plurality of keys, and each light source of the plurality of light sources has an inactive state and an inactive state. In some embodiments, when a given light source of the plurality of light sources is in the active state, the given light source is illuminated and light from the given light source passes through the translucent portion of a corresponding key of the plurality of keys such that the correspond key of the plurality of keys appears to represent the unique character. In some embodiments, when a given light source of the plurality of light sources is in the inactive state, the given light source is not illuminated and no light from the given light source passes through the translucent portion of a corresponding key of the plurality of keys such that the corresponding key of the plurality of keys appears to be devoid of any representation of the unique character.

In some embodiments, each of the plurality of keys are devoid of any other representation of the unique character.

In some embodiments, each key of the plurality of keys includes a smooth interface between respective translucent portions and adjacent opaque portions.

In some embodiments, each key of the plurality of keys includes a translucent film over respective translucent portions and adjacent opaque portions such that respective top layers of each key of the plurality of keys is smooth.

In some embodiments the keyboard may include a configuration key that toggles the keyboard between keyboard active state and a keyboard inactive state, wherein in the keyboard active state, each light of the plurality of lights is illuminated and, in the keyboard inactive state, each light of the plurality of lights is not illuminated.

In some embodiments the keyboard may include logic that stores the active state or inactive state of each of the plurality of light sources, and switches a given light source of the plurality of light sources between the active state and the inactive state based on the stored active state or inactive state of the given light source.

In some embodiments, the translucent portion of each of the plurality of keys is more than about 50% translucent.

In some embodiments the keyboard may include logic that stores the active state or inactive state of each of the plurality of light sources and the logic receives input from one or more of the plurality of keys in conjunction with a given key such that input changes the state of the given key from the active state to the inactive state or from the inactive state to the active state.

In some embodiments, the opaque portion and the translucent portion are substantially the same color.

This Summary introduces a selection of concepts in a simplified form that are further described below in the Detailed Description. As such, this Summary is not intended to identify essential features of the claimed subject matter, nor is it intended to be used to narrow the scope of the claimed subject matter. One or more of the described features may be included in an implementation of an input device.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

The described embodiments of an input device provide a device for training users to provide input without reading characters on touch-based input receivers (e.g., keys). In particular, the input device includes a lighting system that can illuminate characters from a set of touch-based input receivers when the lighting system is in an active state. The lighting system may also be configured in an inactive state, where the lighting system does not illuminate the characters in the set. Thus, a user can be trained on an input device that is convertible from a normal-use configuration to a training configuration.

In an example embodiment of an input device, the input device is a keyboard configured for training typists. The keyboard uses backlighting to selectively hide or show lettering on the keys of the keyboard. Then lights are on, key lettering can be seen by its user. When the lights are off, the lettering is not visible and the keys appear to be a solid color, such as black. This way, the user cannot read letters on the keys, but instead must focus on typing based on positions of the keys on the keyboard. In a more particular example embodiment, a keyboard uses a lighting system under its keys to provide light under each individual key.

One or more of the keys of the keyboard may be manufactured to facilitate use in the keyboard. An example manufacturing process includes coating a clear (translucent or transparent) key base in black or dark paint. The method then includes etching, by a laser for example, through the paint to in a shape of a character on each key so that, when compiled into a keyboard, light from a lighting system can pass through and illuminate the character. The keys can then be coated with a translucent film that fills in the indentation of the removed paint and creates a smooth surface on the top (or front) of each key.

The input device may have a "Lights" button that toggles on or off the lighting system of the input device such that, when the "Lights" button is activated, lettering is visible for one or more of the touch-based input receivers of the input device. When the light is off, the input device appears to be all black and no lettering can be seen. In some embodiments, one or more larger light panels could be used to illuminate characters of a set, such as a proper subset, of the touch-based input receivers of the input device.

Figure 1A:
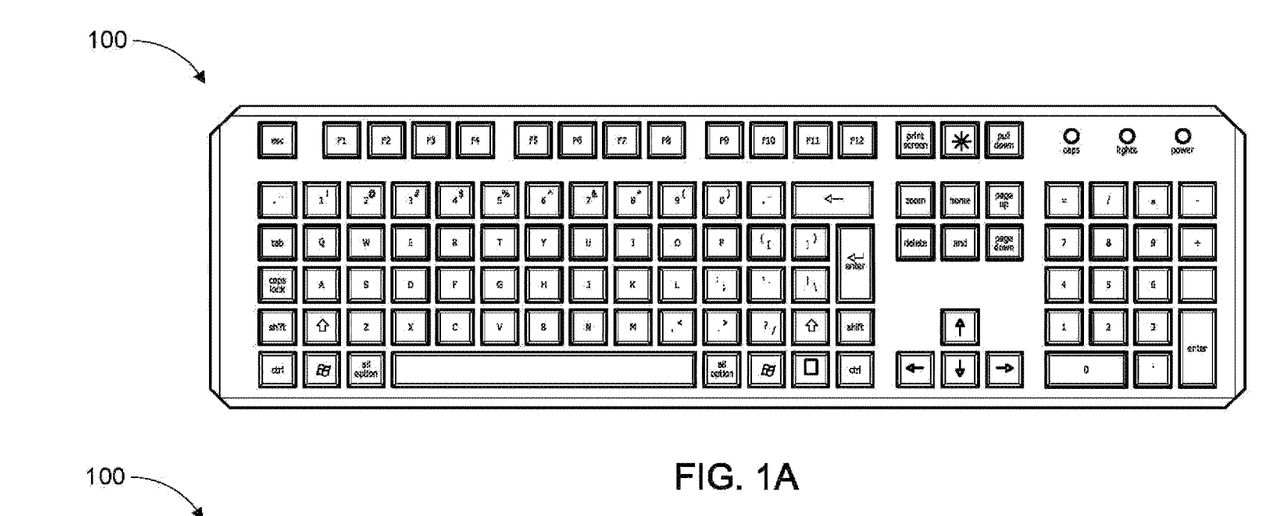
FIG. 1A is a top view of an example input device (e.g., keyboard) shown in an active state where visible light escapes each of a plurality of touch-based input receivers via translucent portions of respective ones of the touch-based input receivers.
Figure 1B:
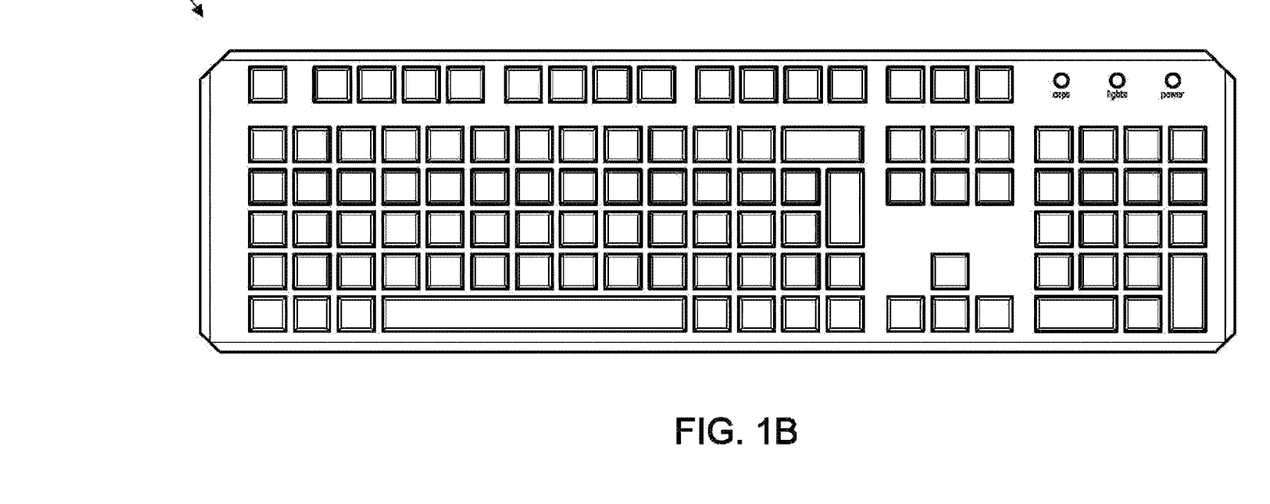
FIG. 1B is a top view of an example input device in an inactive state.
Figure 1C:
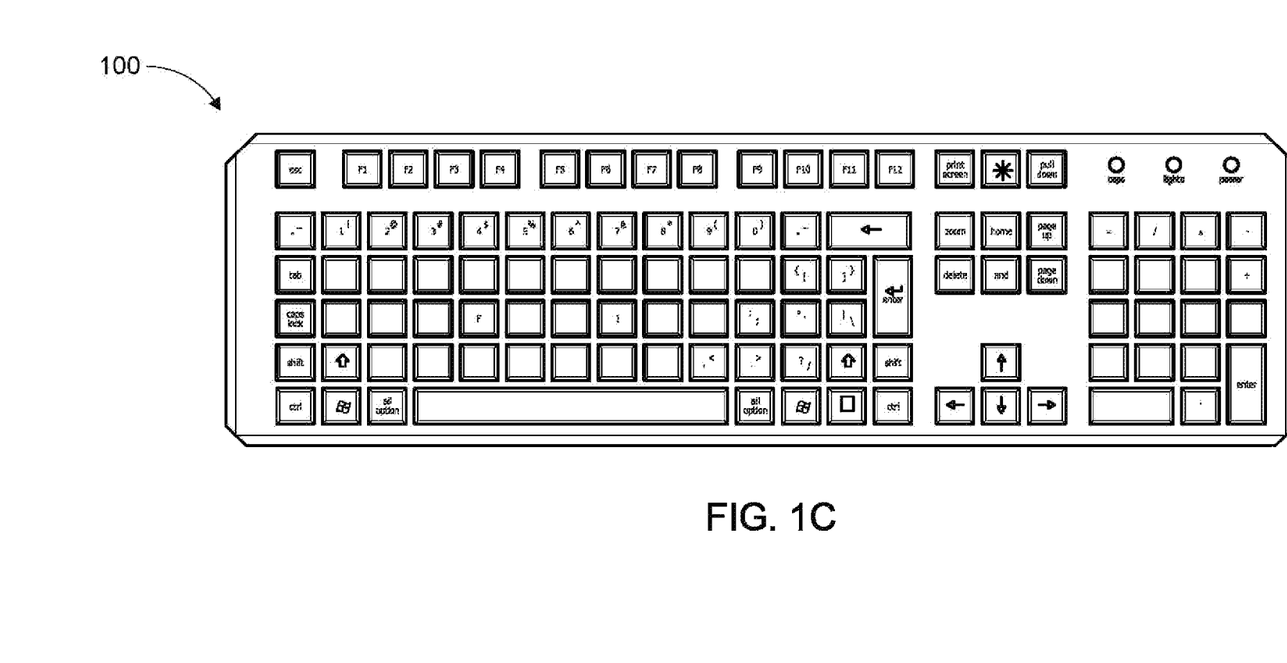
FIG. 1C is a top view of an example input device in an active state where visible light escapes a proper subset of the plurality of touch-based input receivers via translucent portions of respective ones of the proper subset of the touch-based input receivers.

FIGS. 1A-1C illustrate an example embodiment of an input device 100 employing one or more of the techniques described herein. Each of FIGS. 1A-1C shows the input device 100 having a plurality of touch-based input receivers (shown as keys on the keyboard). Although the figures illustrate the input device 100 as a computer keyboard, the techniques herein are not limited to a computer keyboard, nor are they limited to a keyboard with the key configuration shown. For example, the input device may be a musical keyboard or piano. Additionally, the input device may be incorporated in a computing device, such as a laptop computer, or an output device. Alternatively, the input device may be a structurally independent input device that provides output to another device.

FIG. 1A illustrates the input device 100 (e.g., a keyboard) in a standard mode, where characters are visible on all touch-based input receivers of the input device 100. The characters of the touch-based input receivers are visible based on light escaping a translucent portion of each of the touch-based input receivers, with the translucent portion generally surrounded by an opaque portion. The translucent portion may be generally shaped as or to include the character of an associated one of the touch-based input receivers. For example, a touch-based input receiver may have a "T" shaped translucent portion to indicate that, upon input from a user to the touch-based input receiver, the input device 100 will output (e.g., to a computing device) an indication that the user has selected the "T" touch-based input receiver. The translucent portion may be on an outer surface, such as the top or front, of the touch-based input receivers. Further, the translucent portion and the opaque portion, for example, may be substantially the same color.

In some embodiments, the touch-based input receivers may be devoid of an indication of the respective characters of the touch-based input receivers. Additionally, the touch-based input receivers may be devoid of a textural indication of the respective characters of the touch-based input receivers. Thus, indications of the character of respective touch-based input receivers of the input device 100 may be based on 1) light escaping the translucent portion of respective touch-based input receivers and 2) a position of the respective touch-based input receivers within the input device 100.

In some embodiments, the input device 100 may also include some touch-based input receivers with a color or textural indication of the respective characters of the touch-based input receivers. For example, a configuration or "Lights" button may have a color or textural indication that permanently (or semi-permanently) indicates that the button is configured to receive input for toggling the lighting system between the active state and the inactive state.

In some embodiments, the input device 100 may also include a lighting system underneath one or more of the touch-based input receivers. The lighting system is selectively configurable in an activate state and an inactive state. When the lighting system is configured in an active state, one or more light sources of the lighting system are activated such that visible light escapes a set of the plurality of touch-based input receivers via the translucent portion. When the lighting system is configured in an inactive state, one or more light sources of the lighting system are inactive such that one or more of the set of the plurality of touch-based input receivers appear devoid of a symbol of the character. Example embodiments of the lighting system within the input device 100 is shown in greater detail in FIGS. 2A-2C.

In some embodiments, the touch-based input receivers (e.g., keys) may have a clear or transparent base. The different shaped letters on the touch-based input receivers, for example, may be laminated on the transparent touch-based input receiver. In some embodiments, the letters may be laminated on the surface of each clear touch-based input receiver. In some embodiments, the letters may be laminated immediately beneath the surface of each clear touch-based input receiver.

In some embodiments, the lamination may comprise a transparent area in the shape of each character or letter, and the transparent area may be surrounded by a dark area. In some embodiments, the dark area may be black. In some embodiments, the dark area may be dark blue, dark brown, dark grey, or any other dark color. In some embodiments, the top of the lamination may be coated with a dark paint, such as black paint. In some embodiments, the dark coating may be visible when the light sources underneath the touch-based input receivers are deactivated. In some embodiments, when the light sources underneath the touch-based input receivers are activated, light from the light sources may pass through the laminate in a manner that may emit light through the transparent area of the lamination displaying the characters on the touch-based input receivers.

In some embodiments, the lamination may comprise a single frame covering the entire input device 100. In some embodiments, the lamination may be done for individual touch-based input receivers, leaving out the spaces between any given two touch-based input receivers. In some other embodiments, the input device 100 may be covered with multiple laminate frames such that each laminate frame covers each row of the input device 100. In some embodiments, the input device 100 may be covered with multiple laminate frames such that each laminate frame covers each column of the input device 100. Yet in some embodiments, there may be a laminate frame for a set or group of touch-based input receivers.

In some embodiments, the input device 100 may be devoid of one or more touch-based input receivers that are generally standard on a conventional input device. For example, the input device 100 may be devoid of one or more of a number lock, insert, pause key, break key, and scroll lock key. The input device 100 may replace standard touch-based input receivers or add to the standard touch-based input receivers. For example, the input device 100 may replace one or more of a number lock, insert, pause, break, and scroll lock key with one or more of another key, "Set," "Lock," "=," "Zoom," or "Lights" key.

FIG. 1B shows the input device 100 in a testing mode, where characters are not visible on touch-based input receivers of the input device 100. In the testing mode, the lighting system is in an inactive state. FIG. 1C shows the input device 100 in a training mode, where characters are visible on some but not all touch-based input receivers of the input device 100. In other words, the lighting system is configured to illuminate a proper subset of the touch-based input receivers such that visible light escapes the touch-based input receivers of the proper subset. In the training mode, the lighting system is in an active state.

In some embodiments, the touch-based input receivers may also include a translucent film on an upper (or outer) surface of the touch-based input receivers. Thus the translucent film may be disposed over respective translucent portions and adjacent opaque portions such that respective top layers of the touch-based input receivers are smooth. For example the translucent film may fill in any indentation of the translucent portion that was created by removing an opaque coat of the touch-based input receivers. For example, the touch-based input receivers may include a smooth interface between respective translucent portions and adjacent opaque portions based on other manufacturing techniques. As another example, the touch-based input receivers may include a cap on top of the touch-based input receivers that may make the character less or non-visible to a user when the touch-based input receivers are not illuminated.

Figure 1D:
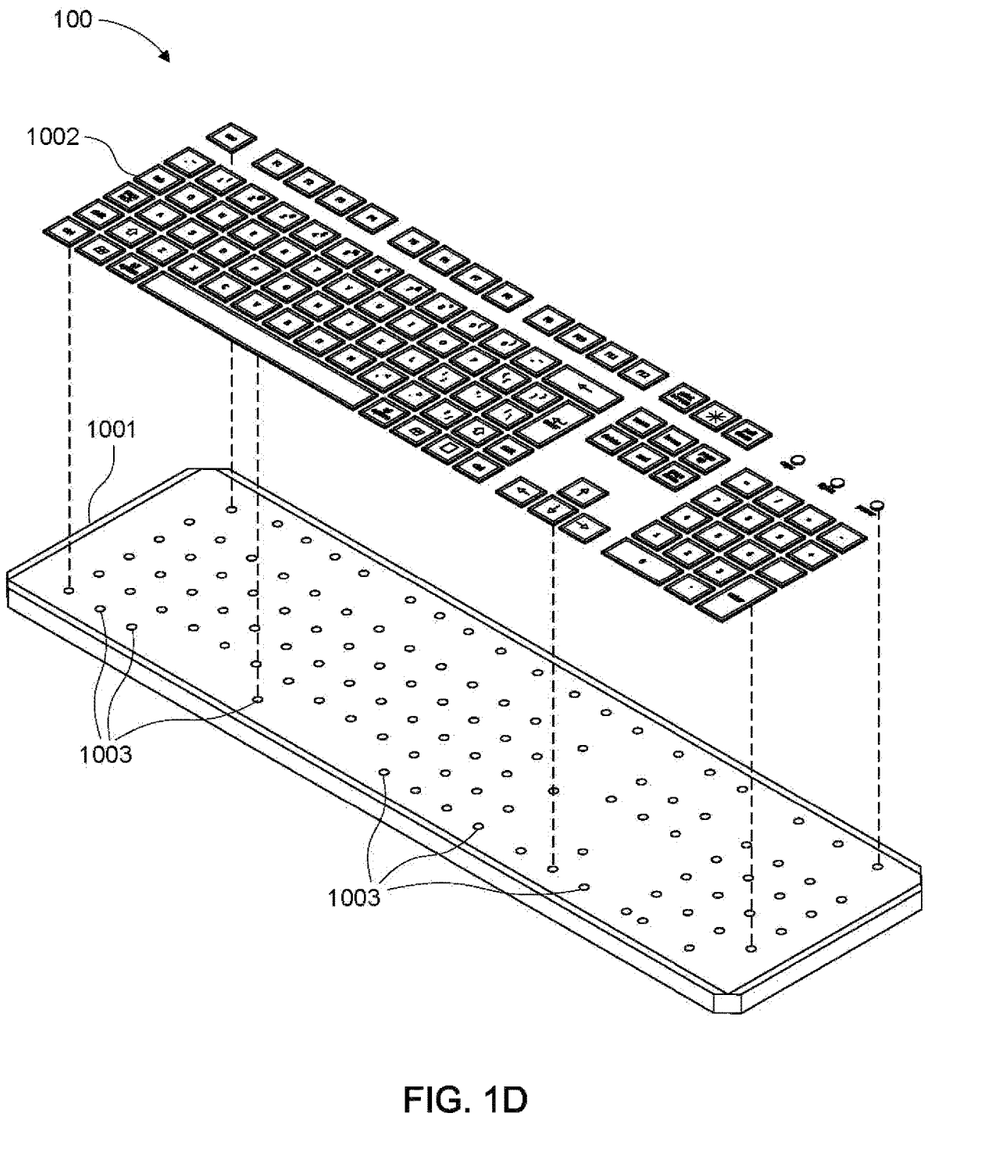
FIG. 1D is an exploded view of an example input device having a plurality of light sources.

FIG. 1D shows an embodiment in which the input device 100 may comprise a lighting system that comprises a plurality of independent light sources 1003. In some embodiments, the input device 100 may include a light source 1003 underneath each of the touch-based input receivers 1002 (e.g., keys). The input device 100 may include a light source 1003, for example, may be disposed on the base 1001 of the input device 100. In some embodiments, a single light source may be disposed underneath each touch-based input receivers. In some embodiments, more than one light source may be disposed underneath one touch-based input receiver. In some embodiments, the input device 100 may be a keyboard connected to a computing device and the touch-based input receivers may comprise keys of the keyboard.

In some embodiments, each of the light sources underneath each row of the touch-based input receivers on the input device 100 may display a single color or frequency. In some embodiments, each of the light sources underneath each column of the touch-based input receivers on the input device 100 may display a single color or frequency. In some other embodiments, each light source may display different colors of light while in some embodiments, each of the light sources may display a single color.

In some embodiments, a specific set of light sources underneath a specific set of touch-based input receivers may display a first color or frequency while another set of touch-based input receivers underneath another specific set of touch-based input receivers may display a second color or frequency and so on. For example, all the touch-based input receivers representing numerals may be of the first color while all the touch-based input receivers representing alphabets may be of the second color.

In some embodiments, each of the light sources may be controlled individually by pressing a specific key or button followed by pressing a corresponding touch-based input receiver of interest. In some embodiments, when the light sources are in an inactivated state, the complete touch-based input receiver including both the opaque and translucent portion will be of a single solid color. In some embodiments, the single solid color is different than any of the colors displayed by the light sources. In some embodiments, the single solid color is black.

Figure 1E:
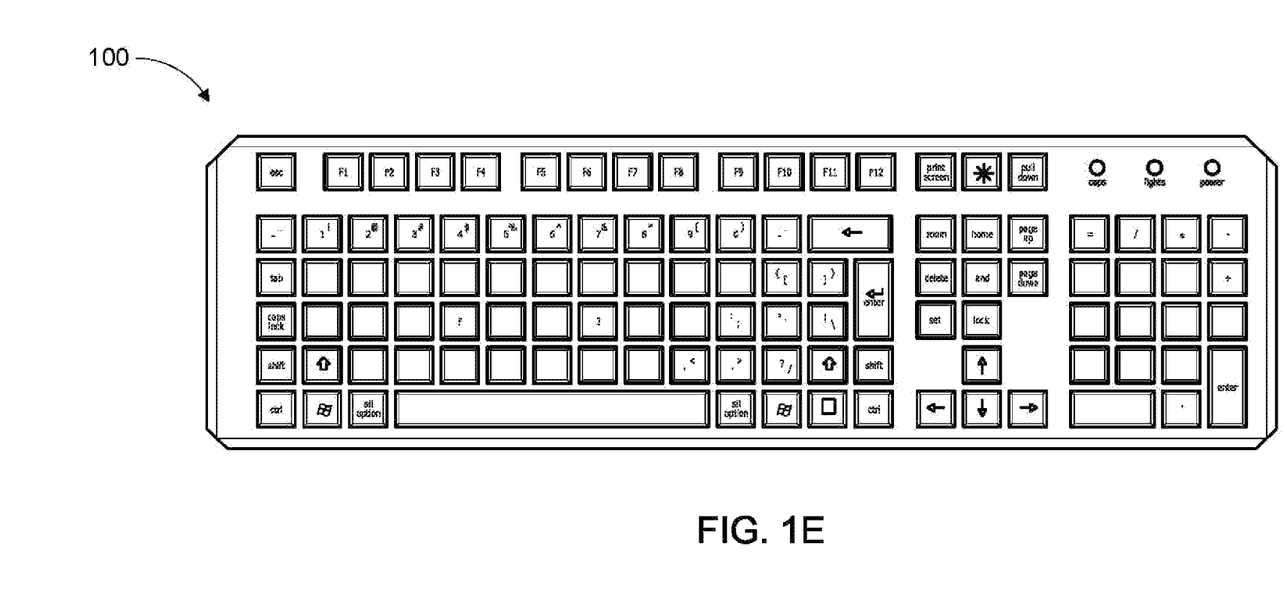
FIG. 1E is a top view of an example input device having a lighting system with the plurality of touch-based input receivers.

FIG. 1E shows an embodiment in which the input device 100 comprises a set key or button. The set key or button is configured to activate and/or deactivate one or more light sources of the lighting system. For example, when the set key or button is pressed, followed by pressing a touch-based input receiver associated with a light source, the light source of the touch-based receiver is activated. In some embodiments, when the set key or button is pressed followed by pressing the touch-based input receiver with the activated light source, the light source gets inactivated.

In some embodiments, the set button may be configured to activate and/or deactivate a group of light sources of a corresponding group of touch-based input receivers when the set button is pressed simultaneously with another set of two keys. For example, pressing the set button simultaneously with the space bar key, followed by pressing a specific numeral key may activate light sources corresponding to all touch-based input receivers representing numbers. In case the light sources of all the touch-based input receivers that represent numbers are already activated, pressing the set button simultaneously with the space bar key, followed by pressing the specific numeral key may deactivate the light sources of all the touch-based input receivers representing numbers. As another example, pressing the set button simultaneously with the space bar key, followed by pressing the Shift key, may activate or deactivate light sources that correspond to touch-based input receivers representing non-alphanumeric keys.

In some embodiments, the set button and the touch-based input receiver may be pressed simultaneously to activate and/or inactivate the light source of the touch-based input receiver. In some embodiments, the set button may be used to activate and/or deactivate the light sources by pressing and holding the set button, for example, for at least 2 seconds or instantaneously. In other embodiments, the input device 100 may replace one of a number lock, insert, pause, break, or scroll lock key with the set key.

In some embodiments, the set key may be a combination of existing keys on the input device 100. For example, the set key can be equivalent to a combination of any number of touch-based input receivers such as, for example, a combination of Ctr+Alt keys, or Ctr+Shift keys, or Alt+Ctrl keys. In another embodiment, the set key can be different combinations of another two existing keys on the input device 100.

In some embodiments, the input device 100 may include a lock key, which may lock the input device 100 in the current configuration. In some embodiments, the lock key may be used to prevent use of or access to some or all of the touch-based input receivers when in the locked state, which may be indicated by the inactivation of light sources underneath the specific touch-based input receivers due to the pressing of the lock key. In some embodiments, pressing of the lock key may allow access to only some of the touch-based input receivers. In some embodiments, one specific touch-based input receiver may be locked from access using the lock key, which may be indicated by the inactivation of the light source underneath the specific touch-based input receiver. In some embodiments, the lock key may be used to lock or prevent usage of a set of touch-based input receivers based on the pressing of the lock key followed by another key. In some embodiments, the pressing of the lock key may be followed by pressing of more than one key to complete the locking of the input device 100.

In some embodiments, the lock key may be pressed or held down for at least three seconds to lock the input device 100. In some embodiments, the lock key may be pressed for less than three seconds. In some embodiments, one or more of the light sources underneath the touch-based input receivers may get activated for at least five seconds following which the input device 100 may be locked. In some embodiments, the light sources underneath the touch-based input receivers may be pressed for less than five seconds. In some embodiments, the light sources underneath the touch-based input receivers may blink for at least 5 seconds before getting locked.

In some embodiments, all the independent light sources underneath all the touch-based input receivers may get deactivated once the input device 100 is in the lock state. In some embodiments, the input device 100 may be locked in the current configuration which may comprise a few of the light sources being activated underneath corresponding few touch-based input receivers, while light sources underneath remaining touch-based input receivers are in a deactivated state. In some embodiments, the current configuration may include all the light sources being in an activated state.

In some embodiments, the lock key may be used to lock only a specific set of touch-based input receivers on the input device 100. For example, pressing the lock key followed by pressing shift key and the number "1" key may result in the locking of only the touch-based input receivers that represent numbers. As another example, pressing the lock key followed by pressing shift key and the alphabet "A" key may result in the locking of only the touch-based input receivers that represent alphabets. In some embodiments, all the individual light sources under the touch-based input receivers representing alphanumeric keys may be locked.

In some embodiments, locking the input device 100 may not affect the lock key itself. In some embodiments, the individual light source underneath the lock key or button may remain activated during the entire duration in which the input device 100 remains locked. The individual light source underneath the lock key or button may get deactivated after the input device 100 is unlocked.

In some embodiments, a passcode or password may be entered after the lock key is pressed before the keyboard is locked. The input device 100 may be locked after the passcode is entered. In some embodiments, the passcode may also be entered to unlock the input device 100. In some embodiments, the lock key may be pressed for at least three seconds.

Figure 2A:
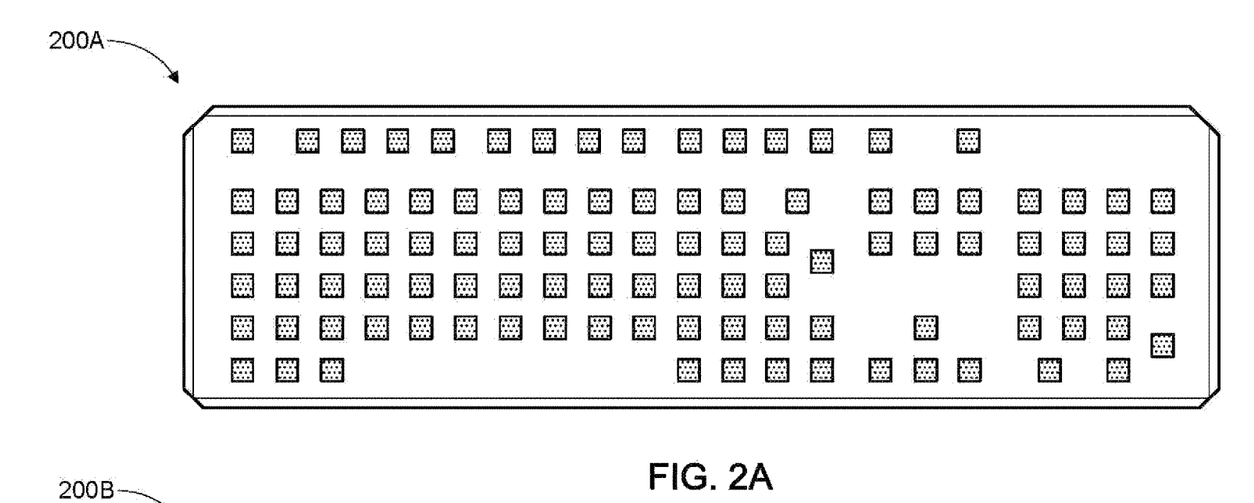
FIG. 2A is a top view of an example input device having a lighting system with the plurality of touch-based input receivers removed or not yet incorporated into the input device in a manufacturing process.
Figure 2B:
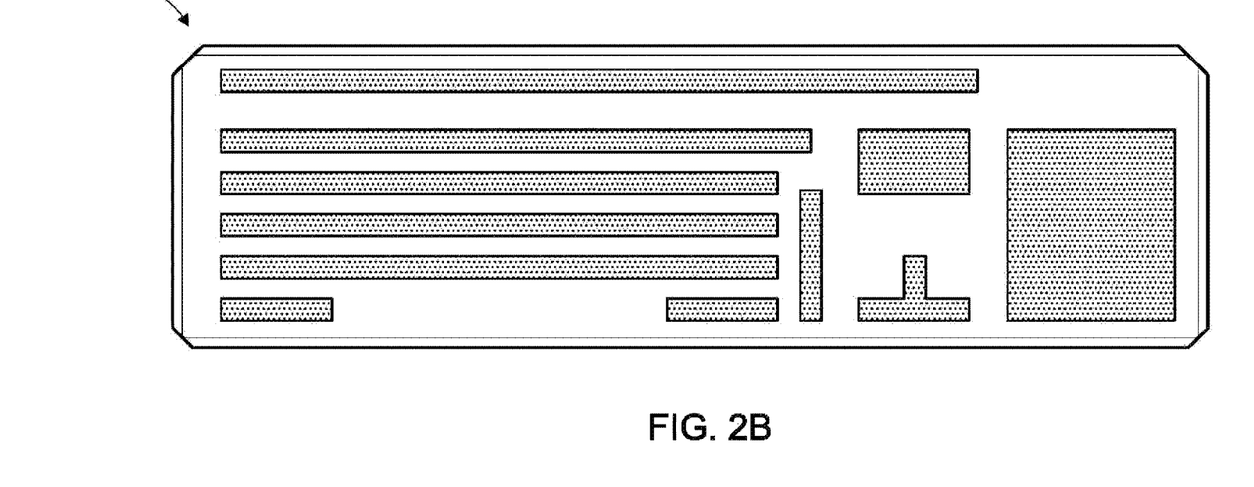
FIG. 2B is a top view of another example input device having a lighting system with the plurality of touch-based input receivers removed or not yet incorporated into the input device in a manufacturing process.
Figure 2C:
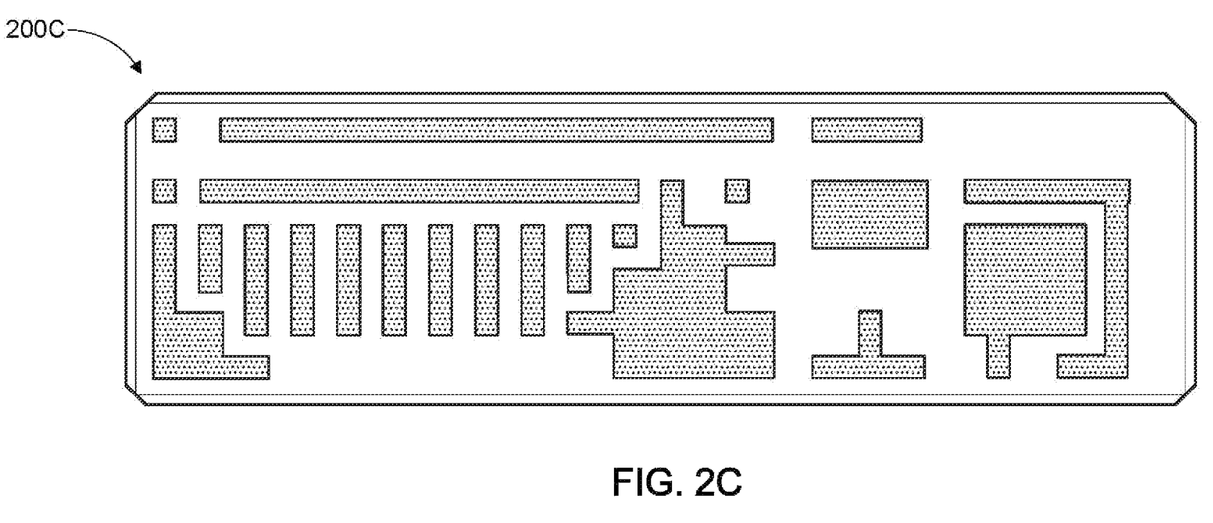
FIG. 2C is a top view of another example input device having a lighting system with the plurality of touch-based input receivers removed or not yet incorporated into the input device in a manufacturing process.

FIGS. 2A-2C illustrate example embodiments of a lighting system 200 employing one or more of the techniques described herein. Each of FIGS. 2A-2C shows the lighting system 200 having a plurality of independent light sources under one or more of the touch-based input receivers. FIG. 2A shows a lighting system 200a having light sources under each of a set of touch-based input receivers. FIG. 2B shows a lighting system 200b that includes light sources for illuminating respective rows of touch-based input receivers in one portion of the input device 100 and groups of related touch-based input receivers in other portions of the input device 100. FIG. 2C shows a lighting system 200c that includes light sources for illuminating respective columns of touch-based input receivers in one portion of the input device 100 and groups of related touch-based input receivers in other portions of the input device 100. Other embodiments of a lighting system 200, such as one having light sources under different combinations of touch-based input receivers or having a single light source under all or substantially all touch-based input receivers are also within the scope of this disclosure.

In some embodiments, the light sources of FIGS. 2A-2C may be any conventional or yet-developed light sources. For example, the light sources may be LED (light emitting diode) light sources or incandescent light sources. The light sources may be controlled independently and/or may be grouped for control by the input device 100.

Individual or groups of light sources of the lighting system 200 may be configured to be activated via input received by the input device 100. For example, the input device 100 may receive input at the input device 100, and from a user, to activate one or more of the light sources. For example, the input device 100 may receive such an input as pressing or holding the configuration or "Lights" button while pressing the touch-based input receivers associated with a light source to be toggled between an active state and an inactive state. Additionally or alternatively, the input device 100 may receive input as a combination of other touch-based input receivers (e.g., a combination of Ctr+Alt keys, or Ctr+Shift keys, or Alt+Ctrl keys and a touch-based input receivers to toggle) to toggle an associated light source between an active state and an inactive state.

In some embodiments, the input device 100 may receive input from a connected computing device for which the input device 100 is configured to receive input from a user. In some of these embodiments, the computing device may execute instructions to perform an application for training a user for using the input device 100. The application may proceed through various training operations that involve activating and deactivating light sources of the input device 100. For example, a training operation may target groups of touch-based input receivers, such as finger assignments, for which light sources are activated and deactivated for training purposes. In a particular example, a light source under a particular touch-based input receiver may flash between active and inactive states to draw the user's attention to the touch-based input receiver. This may happen, for example, when teaching a new key, or to indicate that the user has pushed an incorrect touch-based input receiver.

Additionally or alternatively, the input device 100 may receive input from a remote control device that indicates which, if any, of the light sources are to be active. For example, an instructor may provide input into a remote control device, which transmits a control signal that is received as input at the input device 100 for controlling which, if any, of the light sources are to be active.

In some embodiments, the input device 100 may include a controller (or processor) that includes memory. The controller, for example, may store the state of each light source. As another example, the controller may control power to each of the light sources and may selectively or collectively turn each light source on or off based on the state of each light source.

In some embodiments, the input device 100 may include one or more processors, a memory, and one or more programs. The one or more programs may be stored in the memory and may be executed by the one or more processors. In some embodiments, the one or more programs may include instructions to perform any or all of the functions mentioned in any of the embodiments.

In some embodiments, the one or more programs may include instructions to perform the activation and/or deactivation of one or more light sources of the lighting system underneath one or more of the touch-based input receivers. In some embodiments, the one or more programs may include instructions to perform the activation and deactivation of one or more light sources based on the pressing of the "set" key or button. In some embodiments, the one or more programs may include instructions to perform toggling of the lighting system between the active state and the inactive state based on the pressing of the configuration or "Lights" button.

Although FIGS. 1A-2C describe example embodiments of an input device 100, other implementations of input devices are contemplated. For example, any one or more elements or features described above may be combined or omitted from an embodiment of an input device within this disclosure. Thus, the scope of this disclosure includes implementations having any number of the elements or features described above and is not limited to an implementation having each of the elements and features discussed above or shown in the figures.

Figure 3:
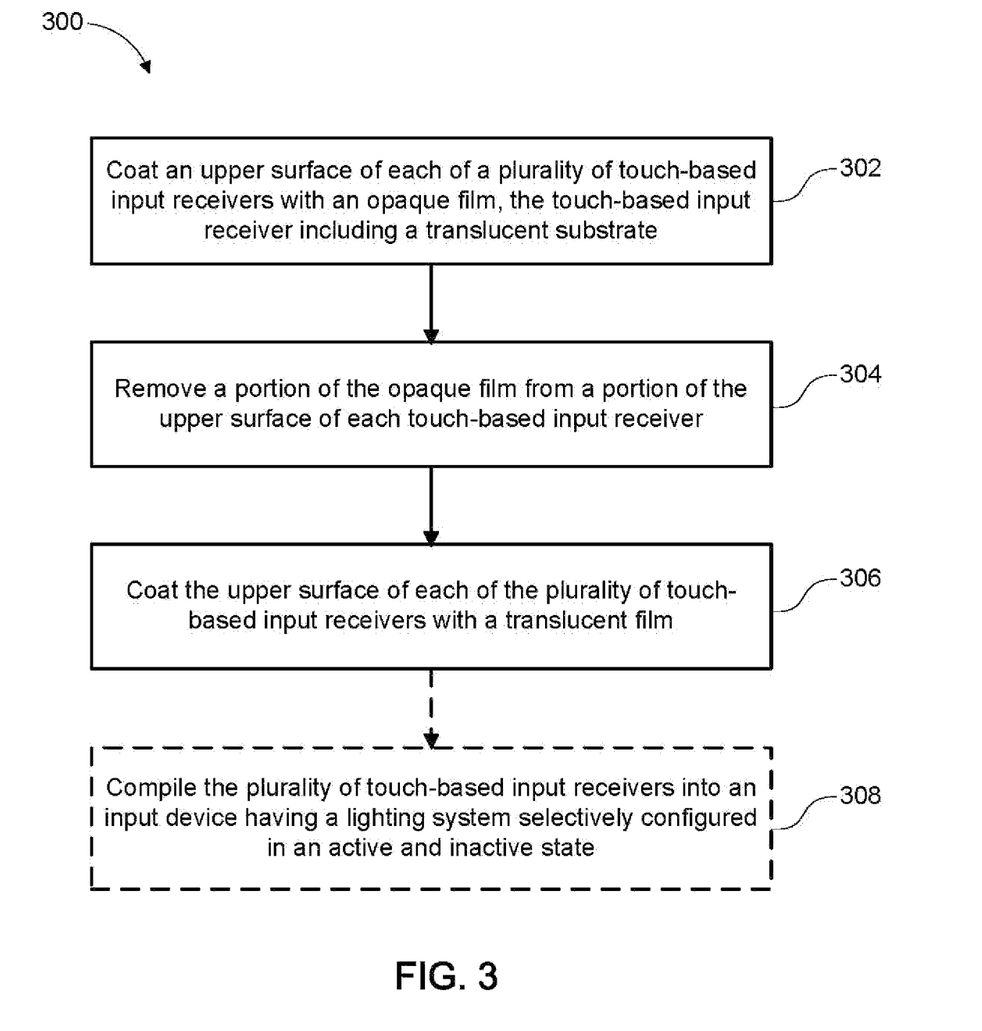
FIG. 3 is flow chart showing a method of manufacturing touch-based input receivers for an input device.

FIG. 3 illustrates a process 300 of manufacturing touch-based input receivers for an input device. Operation 302 includes coating an upper surface of each of a plurality of touch-based input receivers with an opaque film, with the touch-based input receiver including a translucent substrate. The translucent substrate may be, for example, a plastic, rubber, or other synthetic material.

Operation 304 includes removing a portion of the opaque film from a portion of the upper surface of each touch-based input receiver. This can result in a portion of the translucent substrate being exposed, with the respective exposed portions of the translucent substrate of each respective touch-based input receiver shaped as a respective character. Removing the portion of the opaque film may be performed, for example, by laser etching, chemical etching, or mechanical etching.

Operation 306 includes coating the upper surface of each of the plurality of touch-based input receivers with a translucent film. This may result in the upper surface of the touch-based input receivers having a generally smooth transition from the exposed portions of the translucent substrate to adjacent portions of the translucent substrate having an opaque film on the upper surface.

Optional operation 308 includes compiling the plurality of touch-based input receivers into an input device having a lighting system selectively configured in an active and inactive state. Optional operation 308 may result in producing the input device 100 of this disclosure. In other words, the process of method 300 may be a process for producing the input device 100.

Figure 4:
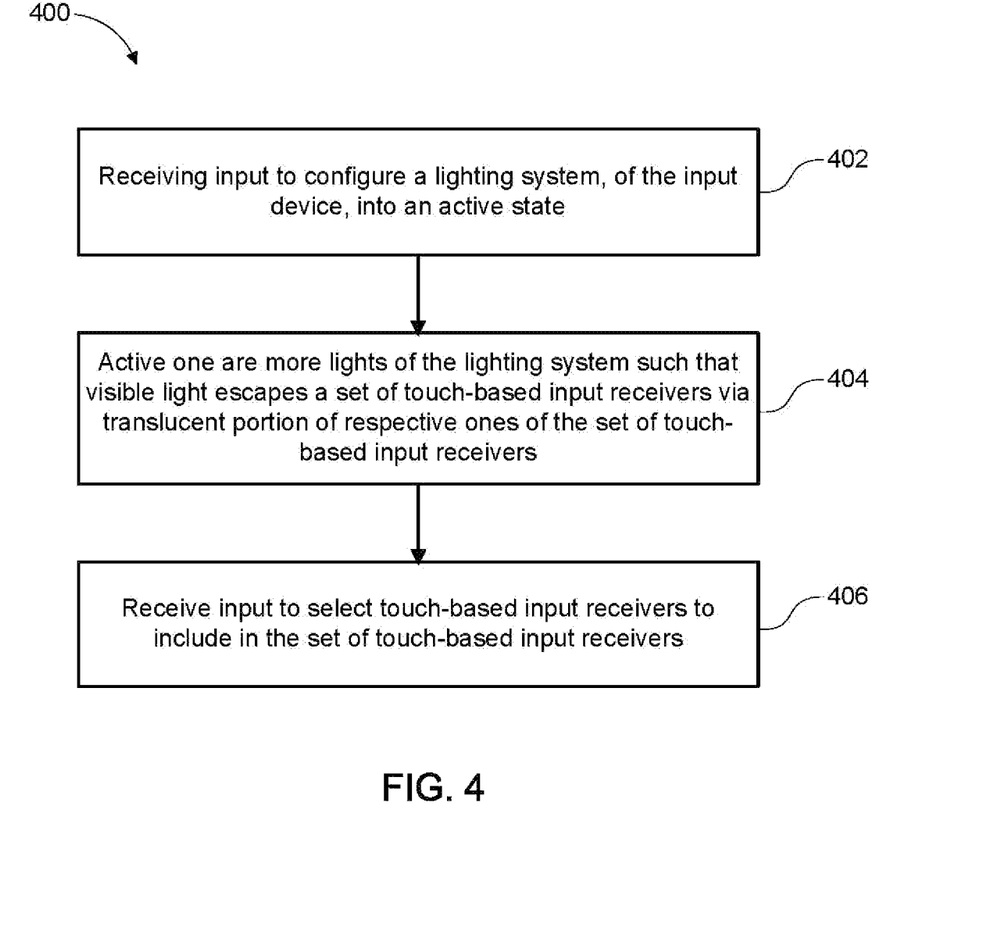
FIG. 4 is flow chart showing a method for illuminating one or more characters via one or more touch-based input receivers.

FIG. 4 illustrates a method, performed by an input device, for illuminating one or more characters via one or more touch-based input receivers. Operation 402 includes receiving input to configure a lighting system, of the input device, into an active state.

Operation 404 includes activating one or more lights of the lighting system such that visible light escapes a set of touch-based input receivers via translucent portions of respective ones of the set of touch-based input receivers. For example, the translucent portions may be shaped as a respective character associated with the touch-based input receivers.

Operation 406 includes receiving input to select touch-based input receivers to include in the set of touch-based input receivers. The received input may include input from a connected computing device for which the input device is configured to receive input from a user. Additionally or alternatively, the received input may include input from a user or input from a remote control device.

Figure 5:
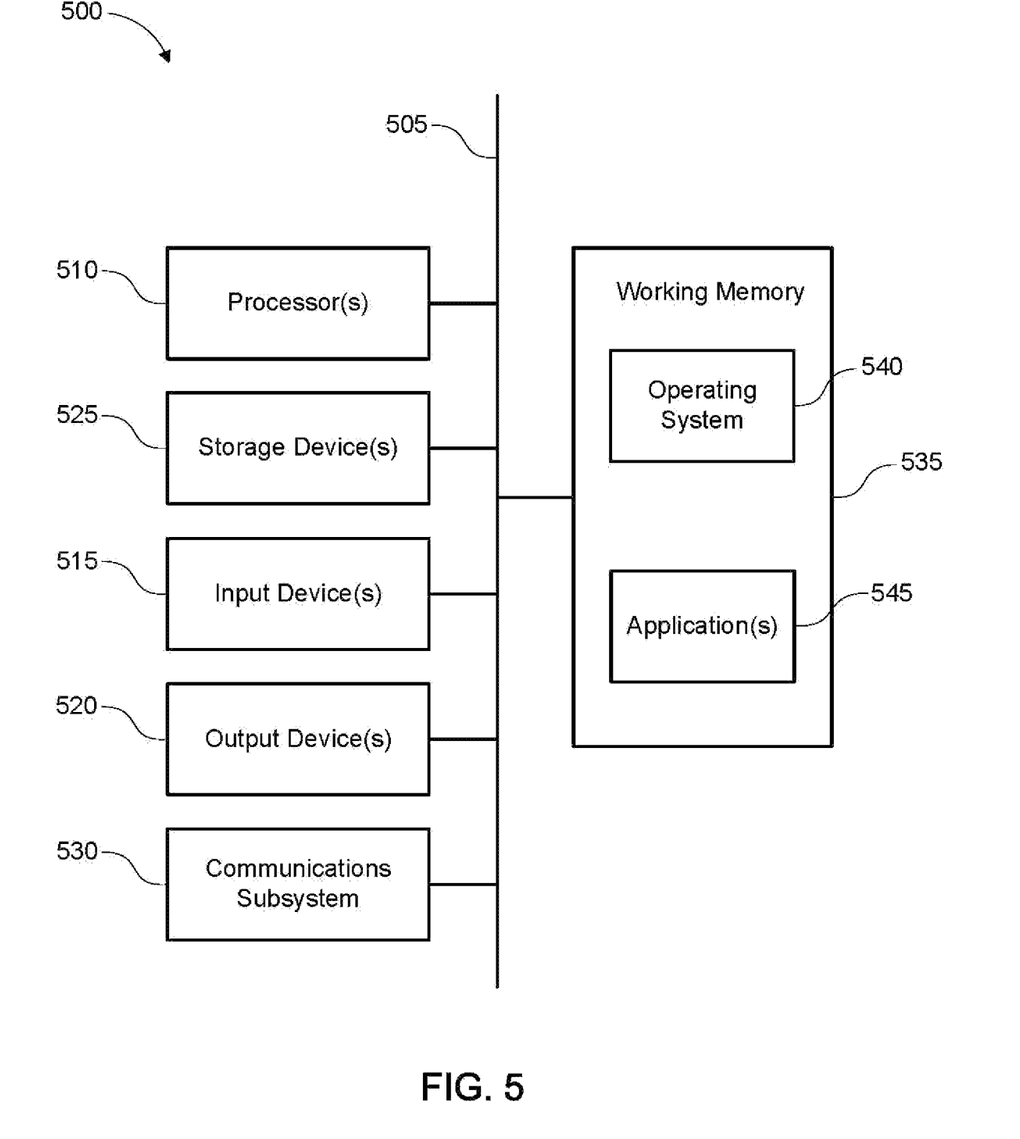
FIG. 5 is a block diagram of a controller that can be used to with or to perform some embodiments described in this document.

The controller 500, shown in FIG. 5 can be used to perform any of the embodiments of the invention. For example, controller 500 can be used to execute one or more blocks of process 300 or the blocks of process 400. As another example, controller 500 can perform any calculation, identification and/or determination described here. As another example, controller 500 may receive inputs from the input device 100 or external device, store the active or inactive state of a given light source and/or toggle the state of a given light source.

Controller 500 includes hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515 (e.g., input device 100), which can include without limitation a mouse, a keyboard and/or the like; and one or more output devices 520, which can include without limitation a display device, a printer and/or the like.

The controller 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The controller 500 might also include a communications subsystem 530, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 530 may permit data to be exchanged with a network (such as the network described below, to name one example), and/or any other devices described in this document. In many embodiments, the controller 500 will further include a working memory 535, which can include a RAM or ROM device, as described above.

The controller 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the controller 500 or in communication with the controller 500. In other embodiments, the storage medium might be separate from a controller 500 (e.g., a removable medium, such as a compact disc, etc.), and/or provided in an installation package, such that the storage medium can be used to program a general-purpose computer with the instructions/code stored thereon. These instructions might take the form of executable code, which is executable by the controller 500 and/or might take the form of source and/or installable code, which, upon compilation and/or installation on the controller 500 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

That which is claimed:

1. A computer keyboard comprising:
   a plurality of keys each having a translucent portion in a shape of a character and a surrounding opaque portion; and a plurality of light sources such that each of the plurality of light sources is placed underneath a corresponding key of the plurality of keys, wherein each light source of the plurality of light sources is in either an active state or an inactive state;

wherein, in the active state, a subset of the plurality of light sources are activated such that visible light passes through the translucent portion of a corresponding subset of the plurality of keys, and wherein in the inactive state, a subset of the plurality of light sources are inactivated such that visible light does not pass through the translucent portion of a corresponding subset of the plurality of keys;

wherein the keyboard comprises a set key that activates a light source, of the plurality of light sources, beneath a corresponding key of the plurality of keys when the set key is pressed followed by pressing the corresponding key, and wherein when the set key is pressed followed by pressing the corresponding key with the activated light source, the light source gets inactivated.

2. The keyboard of claim 1, wherein the computer keyboard is devoid of one or more of a number lock, insert, pause, break, and scroll lock key.

3. The keyboard of claim 1, wherein the set key activates and/or deactivates a group of light sources of a corresponding group of keys when the set key is pressed simultaneously with two more set of specific keys.

4. The keyboard of claim 1, wherein the keys have a transparent base and the characters on the keys are laminated on the transparent key base.

5. The keyboard of claim 1, wherein the plurality of keys includes a smooth interface between respective translucent portions and adjacent opaque portions, and wherein the plurality of keys includes a translucent film over respective translucent portions and adjacent opaque portions such that respective top layers of the keys are smooth.

6. The keyboard of claim 1, wherein the keyboard further comprises a lock key that locks the lighting when pressed for at least three seconds and/or when a passcode or password is entered after the lock key is pressed.

7. The keyboard of claim 6, wherein the lighting is locked in a current configuration when the lock key is pressed.

8. The keyboard of claim 1, further comprising a configuration button configured to receive input for toggling a subset of the plurality of light sources between the active state and the inactive state.

9. The keyboard of claim 1, wherein, when a subset of the plurality of light sources is in the active state, the corresponding plurality of keys includes a proper subset of the plurality of keys.

10. The keyboard of claim 9, wherein members of the proper subset of the plurality of keys are selectable via input to one or both of the keyboard or a connected computing device and wherein a single input selects multiple members of the proper subset of the plurality of keys.

11. A keyboard comprising:
a plurality of keys that include a translucent portion in a shape of a unique character and a surrounding opaque portion;
a set key;
a plurality of light sources disposed beneath the plurality of keys, each light source of the plurality of light sources is disposed beneath a corresponding key of the plurality of keys; and
a controller communicatively coupled with the plurality of light sources, wherein the controller:

receives input to illuminate a first subset of the plurality of light sources;
illuminates the first subset of the plurality of light sources such that visible light is illuminated from each light source of the first subset of the plurality of light sources and the visible light passes through a corresponding first subset of keys of the plurality of keys via the translucent portions of each key of the first subset of keys resulting in a visual display of the unique characters, and a remaining subset of light sources of the plurality of light sources other than the first subset of the plurality of light sources are not illuminated such that visible light does not pass through a corresponding subset of keys and the corresponding inactive set of keys are devoid of any representation of the unique characters;
receives input to select keys to include in the set of keys; and
activates a light source of the plurality of light sources beneath a corresponding key of the plurality of keys when the set key is pressed followed by pressing the corresponding key, and wherein when the set key is pressed followed by pressing the corresponding key with the activated light source, the light source gets inactivated.

12. The keyboard of claim 11, wherein the opaque portion and the translucent portion are substantially the same color.

13. The keyboard of claim 11, wherein each key of the plurality of keys includes a smooth interface between respective translucent portions and adjacent opaque portions.

14. The keyboard of claim 11, wherein each key of the plurality of keys includes a translucent film over respective translucent portions and adjacent opaque portions such that respective top layers of each key of the plurality of keys is smooth.

15. The keyboard of claim 11, further comprising a configuration key that toggles the keyboard between a keyboard active state and a keyboard inactive state, wherein in the keyboard active state, visible light passes through each light source of the plurality of light sources and in the keyboard inactive state, visible light does not pass through each light source of the plurality of light sources.

16. The keyboard of claim 11, wherein the controller:
stores the illumination state of each of the plurality of light sources, and
illuminates a given light source of the plurality of light sources.

17. The keyboard of claim 11, wherein controller:
stores the illumination state of each of the plurality of light sources, and
receives input from one or more of the plurality of keys in conjunction with a given key such that the input changes the illumination state of a corresponding light source of the plurality of light sources from being illuminated to not illuminated or from being not illuminated to illuminated.

18. A computer keyboard comprising:
a plurality of keys each having a translucent portion in a shape of a character and a surrounding opaque portion; and
a plurality of light sources such that each of the plurality of light sources is placed underneath a corresponding key of the plurality of keys, wherein each light source of the plurality of light sources is in either an active state or an inactive state;

wherein, in the active state, a subset of the plurality of light sources are activated such that visible light passes through the translucent portion of a corresponding subset of the plurality of keys, and wherein in the inactive state, a subset of the plurality of light sources are inactivated such that visible light does not pass through the translucent portion of a corresponding subset of the plurality of keys;

wherein the keyboard further comprises a lock key that locks the lighting when pressed for at least three seconds and/or when a passcode or password is entered after the lock key is pressed.

\* \* \* \* \*